(12) United States Patent
Garg et al.

(10) Patent No.: US 7,307,772 B2
(45) Date of Patent: Dec. 11, 2007

(54) HYBRID PROCESS FOR DEPOSITING ELECTROCHROMIC COATING

(75) Inventors: Diwakar Garg, Emmaus, PA (US); Philip Bruce Henderson, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/518,802

(22) Filed: Sep. 11, 2006

(65) Prior Publication Data
US 2007/0008605 A1    Jan. 11, 2007

Related U.S. Application Data

(63) Continuation of application No. 10/806,743, filed on Mar. 23, 2004, now Pat. No. 7,106,488.

(51) Int. Cl.
*G02F 1/15* (2006.01)
*B05D 5/12* (2006.01)

(52) U.S. Cl. .................. 359/265; 429/231.5; 429/188; 429/304; 427/126.3; 427/162; 427/164; 427/165; 427/166; 427/372.2; 427/374.6; 427/398.6; 427/533; 427/535; 427/569; 427/576

(58) Field of Classification Search ........ 359/265–275; 429/231.5, 188, 304; 427/126.3, 162, 164, 427/165, 166, 372.2, 374.6, 398.6, 533, 535, 427/569, 576
See application file for complete search history.

(56) References Cited

U.S. PATENT DOCUMENTS

| | | | |
|---|---|---|---|
| 4,687,560 A | 8/1987 | Tracy et al. | |
| 4,737,379 A | 4/1988 | Hudgens et al. | |
| 5,659,417 A | 8/1997 | Van Dine et al. | |
| 5,699,192 A | 12/1997 | Van Dine et al. | |
| 5,724,177 A | 3/1998 | Ellis et al. | |
| 5,757,537 A | 5/1998 | Ellis et al. | |
| 5,919,571 A | 7/1999 | Badding et al. | |
| 5,985,486 A | 11/1999 | Giron | |
| 6,156,395 A | 12/2000 | Zhang et al. | |
| 6,515,787 B1 | 2/2003 | Westfall et al. | |
| 6,743,524 B2 * | 6/2004 | Schaepkens | ............... 359/265 |
| 2001/0031403 A1 | 10/2001 | Giron | |
| 2003/0156313 A1 | 8/2003 | Serra et al. | |

OTHER PUBLICATIONS

S. K. Deb, Applied Optics, Supplement 3, Electophotography, (1969), p. 192.

Tracy, E. Edwin et al; "Process for Fabrication of Metal Oxide Films;" Government report DE922017155 (a US Department of Energy publication of U.S. Appl. No. 07/553,462).

"Thin Film Deposition by Evaporative Condensation and Sputtering;" Industrial Plasma Engineering, vol. 2; Applications to Nonisothermal Plasma Processing, Chapter 23; published by Institute of Physics Publishing, 2001; pp. 451-501.

* cited by examiner

*Primary Examiner*—Evelyn A. Lester
(74) *Attorney, Agent, or Firm*—Michael K. Boyer

(57) ABSTRACT

A method of producing an electrochromic device, includes the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein at least one and less than all of the providing steps include(s) plasma chemical vapor deposition. An electrochromic device produced by the method of the invention is disclosed, as is an apparatus adapted to perform the method of the invention, including plasma CVD devices and vacuum sputtering devices.

16 Claims, No Drawings

HYBRID PROCESS FOR DEPOSITING ELECTROCHROMIC COATING

This Application is a continuation of application Ser. No. 10/806,743, filed on Mar. 23, 2004, now U.S. Pat. No. 7,106,488.

BACKGROUND OF THE INVENTION

The present invention pertains to the production of multilayer electrochromic devices (ECDs). More specifically, this invention pertains to a hybrid process for the production of ECDs utilizing plasma chemical vapor deposition (CVD) and at least one other deposition technique.

The phenomenon of chromogenic properties has been extensively studied because of its extreme importance in architectural and automotive markets. Chromogenic properties relate to a change in optical properties of a given material upon the application of a stimulus. Electrochromic materials undergo a reversible coloration with the application of an electric field or current, thus giving full control of the coloration to the user. The color change may be the result of the formation of color centers or alternatively an electrochemical reaction that produces a colored compound. The phenomenon of electrochromism in tungsten trioxide ($WO_3$) was first reported by S. K. Deb in Applied Optics, Supplement 3, Electrophotography, (1969) page 192. Much has been written about the energy savings and increased comfort gained if large electrochromic devices (ECDs) were available as a feature of architectural and automotive windows.

A simple deposition of a thin film of the electrochromic material on a transparent substrate is not practical as an ECD. A functional ECD requires the sequential combination with other material thin films. A typical multilayer ECD consists of the following layers deposited sequentially on a transparent substrate such as glass or a thin polymer web:
1. (Optional) Substrate barrier layer: prevents migration of harmful substances from the substrate into the ECD.
2. Bottom electron conducting layer: provides a means to connect a power source/ground to the ECD.
3. Working electrode: the electrochromic material that reversibly changes color upon the reversible injection of ions and electrons.
4. Ion conducting layer: a layer that is both electron insulating and ion conducting. This section may need to be made of multiple materials or multiple layers for compatibility with the working electrode and ion storage electrode.
5. Ion storage electrode: stores the ions from the working electrode. It must have no color change or a complementary color change with the working electrode, i.e., when the working electrode is transparent the ion storage electrode must also be transparent, and when the working electrode is colored the ion storage electrode may or may not be colored.
6. Top electron conducting layer: provides a means to connect a power source/ground to the ECD.
7. (Optional) Top barrier layer: protects the ECD from contamination from the environment external to the device. This barrier layer may be a thin film or a laminated thick material, but must be transparent.

When a current is applied, the ions move from the ion storage electrode, through the ion-conducting layer and are injected into the working electrode. By reversing the current direction the ions are removed from the working electrode and injected back into the ion storage electrode. The working electrode changes color upon the injection and removal of the ions. For example $W^{(VI)}O_3$ is transparent but if combined with a Li ion and electron it is converted to $LiW^{(V)}O_3$, which is highly colored.

The thickness of various layers required in a multilayer ECD structure is dependent upon the function of layers. For example, the thickness of top and bottom electrodes can vary from 200 to 500 nanometer (nm). The thickness of the ion conductive layer can vary from 50 to 300 nm. Likewise, the thickness of working and ion storage electrodes can vary from 200 to 700 nm.

Recently, different methods for depositing the sequential ECD layers on the substrate have been researched. Conventionally, ECDs are manufactured using a single deposition technology—primarily magnetron sputtering under vacuum. The deposition rate by sputtering process greatly depends upon the material that is being deposited. This method can be acceptable for easily sputtered or evaporated materials such as the material used for depositing electroconductive and ion conductive layers. It can be extremely slow for materials that are difficult to sputter or evaporate such as the materials used for depositing working and ion storage layers. Consequently, the sputtering process can be performed to produce ECDs on a large scale, but it becomes very difficult and time consuming to use the sputtering process for depositing working and ion storage electrode layers. For example, typical sputter deposition rates of a common working electrode material, $WO_3$, are much less than one nm per second. Therefore, it is difficult to manufacture the entire multilayer ECD economically by using only vacuum sputter as the sole deposition method.

In the vacuum evaporation and sputtering deposition techniques, thin films of $WO_3$, for example, are deposited in a vacuum environment from sources of W in an oxidizing atmosphere or $WO_3$ in an inert or an oxidizing atmosphere. In the vacuum evaporation technique, the source material is heated to a vapor pressure sufficient to cause evaporation and condensation of the material onto a substrate. In the sputtering technique, the source material is converted to the vapor phase by positive ion bombardment. In both cases, thin film deposits of the $WO_3$ are formed by vapor condensation on a substrate in the vacuum chamber.

U.S. Patent Application No. 2001/0031403 A1 describes a completely solid state ECD preferably deposited entirely by vacuum sputtering. The specification also discloses that other deposition techniques could be used or combined with vacuum sputtering. The vacuum techniques described are all physical deposition techniques (evaporation, reactive evaporation and reactive sputtering) and the "decomposition of precursors" techniques such as thermal pyrolysis and sol-gel. Thermal pyrolysis can be a vacuum or a non-vacuum technique. Sol-gel is, on the other hand, a non-vacuum, wet deposition technique.

The sol-gel deposition technique produces an oxide coating by depositing a colloidal solution onto a substrate. U.S. Pat. Nos. 5,659,417 and 5,699,192 both describe an ECD containing ion-conducting layer deposited by sol-gel techniques. While these patents describe forming all the layers by various sol-gel techniques, the examples also describe depositing the ion-conducting layer via sol-gel techniques, and depositing the other layers by reactive sputtering. However, these techniques suffer from inefficiencies related to alternating between vacuum and wet deposition techniques.

Plasma enhanced deposition techniques produce thin films by synthesizing reaction products from several ionized gaseous reactants under vacuum. In this context, plasma is an electrically neutral, highly ionized gas composed of ions, electrons, and neutral particles. Plasma enhanced deposition occurs when an electrical discharge in a low-pressure mixture of volatile reactants causes the formation of a variety of highly energetic species, e.g., atoms, metastables, radicals, and ions. These species then chemically interact to form stable deposits. In plasma enhanced chemical vapor deposition (PECVD), the power required to stimulate the gas-phase chemical reactions can be provided by radio-frequency electromagnetic radiation directed into the low pressure reaction chamber. Plasma enhanced CVD can in many cases provide deposition rates that are more than one order of magnitude higher than typically observed with vacuum sputtering even for the materials that are difficult to deposit by sputtering.

The PECVD method has been utilized to prepare electro-optically active transition metal oxides as disclosed in U.S. Pat. No. 4,687,560. The patent discloses thin films that would be useful as a working electrode and ion storage electrode. ECD structures are disclosed.

U.S. Pat. No. 6,156,395 discloses a PECVD method in the production of vanadium oxide thin-film layers. The patent discloses that the claimed deposition method and thin films could be used in an ECD. Vanadium-based films are one of the preferred compositions in an ECD for the ion storage layer.

U.S. Patent Application No. 2003/0156313 discloses an ECD, where the structure comprises at least one layer of electrochromic material and a layer of electronic insulating transparent ion-conducting solid electrolytic material, and where at least one of these layers is nanostructured. The reference discloses that the layers may be deposited by vacuum sputtering, PECVD, or vapor phase physical deposition techniques. Although the reference teaches that a nanostructured layer can comprise a plurality of layers deposited under different conditions, there is no suggestion of using a combination of PECVD and another deposition technique to provide a single layer within the ECD or different layers in the same ECD. Combinations of RF sputtering and ionic sputtering are the only examples given.

Accordingly, it is desired to provide a more efficient and less expensive method for manufacturing an ECD. It is further desired to provide such a method, which utilizes a combination of different deposition techniques to enhance the overall efficiency of the method.

All references cited herein are incorporated herein by reference in their entireties.

BRIEF SUMMARY OF THE INVENTION

Accordingly, the invention comprises a method of producing an electrochromic device, said method comprising the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein at least one and less than all of the providing steps comprise(s) plasma enhanced chemical vapor deposition.

Also provided is a method of producing an electrochromic device comprising a first electron conducting layer on a substrate, a working electrode in communication with the first electron conducting layer, an ion conducting layer in communication with the working electrode, an ion storage electrode in communication with the ion conducting layer, and a second electron conducting layer in communication with the ion storage electrode, said method comprising: providing by plasma enhanced chemical vapor deposition at least one and less than all of the first electron conducting layer, the working electrode, the ion conducting layer, the ion storage electrode, and the second electron conducting layer; and providing by vacuum sputtering each of the first electron conducting layer, the working electrode, the ion conducting layer, the ion storage electrode, and the second electron conducting layer not provided by plasma enhanced chemical vapor deposition.

Further provided is an electrochromic device prepared by the method of the invention. The device comprises a first electron conducting layer, a working electrode in communication with the first electron conducting layer, an ion conducting layer in communication with the working electrode, an ion storage electrode in communication with the ion conducting layer, and a second electron conducting layer in communication with the ion storage electrode, wherein the at least one layer deposited by plasma enhanced CVD has enhanced contact with at least one adjacent layer.

Still further provided is an apparatus adapted to perform the method of the invention, including at least one vacuum chamber adapted to plasma clean a surface of the substrate; at least one vacuum chamber adapted to deposit at least one coating on the substrate by plasma enhanced CVD; and at least one vacuum chamber adapted to deposit at least one coating by sputtering.

DETAILED DESCRIPTION OF PREFERRED EMBODIMENTS OF THE INVENTION

This invention provides an efficient method of manufacturing an ECD. The basis of the most preferred embodiment of the invention is to combine the thin film deposition techniques of plasma assisted or plasma enhanced chemical vapor deposition (hereinafter collectively referred to as "plasma CVD" or "plasma enhanced CVD") and vacuum sputtering into a hybrid process. The hybrid process takes advantage of commercial sputter processes when appropriate (for example, to provide the barrier and transparent electron and ion conductive oxide layers) and plasma CVD when appropriate (for example, to provide the working electrode and ion storage layers).

Because of the advantages in significantly higher deposition rate, materials cost and power afforded by plasma CVD compared to vacuum sputtering, a process using plasma CVD for depositing all of the layers of an ECD might be the most efficient under some circumstances. However, the addition of plasma CVD chambers to existing vacuum sputter equipment set up to run processes depositing one or more of the desired ECD layers would come with a much reduced capital equipment cost versus building an entire plasma CVD process. In at least this case, the hybrid process is the best mode.

The preferred method of the invention comprises the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein at least one and less than all of the providing steps comprise(s) plasma CVD. Although it is preferred to build up the ECD one layer upon another, the invention as defined by the foregoing combination of steps is not intended to be limited as to the order in which the steps are performed.

Thus, for example, it is possible for the working electrode to be provided in communication with the first electron conducting layer before or after the second electron conducting layer is provided in communication with the ion storage electrode.

The term "communication" as used herein to define the relationship between two (or more) objects is intended to encompass physical contact between adjacent objects as well as interaction between non-contacting objects. Thus, for example, identifying two layers as being in communication with each other does not necessarily require physical contact between the layers, but rather leaves open the possibility that one or more other layer(s) might separate the two layers.

As used herein, the expression "all of the providing steps" refers to the steps of providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode.

Any of the providing steps can comprise plasma CVD. However, it is preferred to limit the use of plasma CVD to those providing steps where plasma CVD provides an overall economic benefit to the method. Typically, this means that plasma CVD is used only for depositing the layers of the ECD that are difficult and expensive to deposit by sputtering, while other deposition method(s), such as vacuum sputtering, are used to deposit the balance of the ECD layers. The difficult to deposit layers of the ECD (from most difficult to least difficult) are typically the working electrode, the ion storage electrode, ion conducting layer, and electron conducting layer. Thus, in certain preferred embodiments, only the working electrode is provided by plasma CVD, while other deposition method(s), such as vacuum sputtering, is/are used to deposit the balance of the ECD layers. In other preferred embodiments, only the working electrode and the ion storage electrode are provided by plasma CVD, while other deposition method(s), such as vacuum sputtering, are used to deposit the balance of the ECD layers.

In addition to providing individual layers of the ECD using a single type of deposition technique (e.g., plasma CVD) it is also within the scope of the invention to provide individual layers of the ECD using more than one type of deposition technique (e.g., plasma CVD and vacuum sputtering).

The preferred plasma CVD process preferably incorporates precursors such as, e.g., $WF_6$, $MoF_6$, or a mixture of the two hexafluorides, combined with $O_2$ and $H_2$ in an inert gas similar to the process described in government report DE922017155 (a U.S. Department of Energy publication of U.S. patent application Ser. No. 07/553,462, filed in 1990, now U.S. Pat. No. 5,005,768).

While $WF_6$ and $O_2$ are favored reactants, it will be appreciated that other metal-bearing compounds and oxygen-bearing compounds are within the scope of the present invention. By way of example, moderate-vapor pressure tungsten compounds capable of plasma CVD, i.e., existing as solids or liquids, may be utilized as reactants. In a commonly known experimental technique, compounds with boiling points less than 500° C. can be dynamically heated in situ under vacuum to raise their vapor pressures to sufficient levels to foster gaseous transport into the deposition chamber. Examples of tungsten-bearing compounds include, but are not limited to, tungsten organometallics (such as tungsten carbonyl and trimethyl tungsten), tungsten halides (e.g., $WCl_6$, $WCl_5$, $WCl_4$, $WBr_6$, $WBr_5$, $WI_2$, and $WI_4$) and tungsten oxyhalides (e.g., $WOBr_2$, $WOBr_4$, $WOCl_2$, $WOCl_4$, and $WOF_4$). Examples of oxygen-bearing compounds include but are not limited to $O_3$, $OF_2$, $H_2O$, $H_2O_2$, $CO_2$, $NO$, and $N_2O$.

Additional oxides exhibiting cathodic electrochromic coloration including oxides of molybdenum, vanadium, niobium, and titanium may be synthesized by plasma CVD in a fashion similar to the synthesis of $WO_3$. Plasma CVD reaction of appropriate moderate-vapor pressure compounds (organometallics, halides, and oxyhalides) of these metals with oxygen (optionally with hydrogen) would also produce electro-optically active oxides. Examples of these compounds include $MoOF_4$, $MoF_6$, $VCl_4$, $VF_5$, $VOBr_3$, $VOCl_3$, $NbF_5$, $TiBr_4$, $TiCl_4$, $TiF_4$, $TiI_4$, organometallic compounds of Mo, V, Nb and Ti and the like.

Moreover, oxides exhibiting anodic electrochromic coloration such as the oxides of iridium, rhenium, nickel, and cobalt may be synthesized by plasma CVD. Again, as with plasma CVD of $WO_3$, moderate-vapor pressure compounds of iridium, rhenium, nickel, and cobalt can be utilized as metal-bearing starting reactants in combination with oxygen (and optionally, hydrogen) to form metallic oxides for use in electrochromic applications. Examples of these compounds include $IrF_6$, $ReOF_4$, $Ni(CO)_4$, $Co(NO)(CO)_3$, organometallics and the like.

The plasma CVD technique further lends itself to the synthesis of mixed-oxide electrochromic compounds such as $WO_3/MoO_3$, $WO_3/VO_3$, $WO_3/Nb_2O_5$, and the like. Precise tailoring of the electrochromic optical absorption spectrum is achieved by controlling the mixture of appropriate volatile metal-bearing compound reactants during the reactive plasma CVD. For example, plasma CVD of various ratios of $WF_6$ and $MoF_6$ metal halide reactants with oxygen (and optionally, hydrogen) results in $WO_3$ /$MoO_3$ mixed oxides having optical properties that reflect the quantitative nature of their reactant ratios.

The presence of hydrogen in the chamber during the plasma CVD significantly speeds the formation of the metal oxide and enhances the deposition rate. The deposition rate of the metal oxide with hydrogen in the process of this invention can be twenty to one hundred times the deposition rate obtained without the presence of hydrogen. For example, in certain embodiments of the invention, plasma CVD rates may be greater than 400 angstroms per second.

The amount of hydrogen which is included in the reaction chamber may vary. Generally, the mole ratio of hydrogen to metallic reagent present in the plasma CVD reaction chamber is in the range of about 0.001:1 to 6:1. More preferably, this mole ratio is in the range of about 0.001:1 to 4:1, and even more preferably it is in the range of about 0.001:1 to 3:1. The ratio may vary depending upon the particular reactants used, the nature of plasma source and power used, the temperature of the substrate on which the oxide is deposited, etc.

The vapor pressures of reactants are effective for establishing a predetermined system pressure, which is required to produce the proper thermodynamic conditions for igniting the plasma in the deposition chamber. The reactive plasma is preferably ignited, established, and maintained by radio-frequency (RF) power generated by a power supply containing means for tuning the frequency of the RF power supplied to the deposition chamber. The preferred radio frequency is about 13.56 MHz for optimum thin-film production. The plasma reaction is preferably initiated within the deposition chamber by applying a definite amount of energy for a suitable deposition period. While the preferred technique for igniting the plasma is by using RF power, those skilled in the art will recognize that other means for igniting, establishing, and maintaining a plasma are within the scope of the present invention, such as direct current, low-frequency alternating current, high-frequency alternating current, microwave, linear microwave, ECR, and other techniques.

Vacuum sputtering is the most preferred deposition technique to combine with plasma CVD. In certain preferred embodiments, all providing steps comprise either vacuum sputtering or plasma CVD. Suitable vacuum sputtering techniques are not particularly limited, and non-limiting examples thereof are disclosed in Industrial Plasma Engineering, Volume 2; Applications to Nonisothermal Plasma Processing, Chapter 23, "Thin-Films Deposition by Evaporation, Condensation and Sputtering," pp. 451-501, published by Institute of Physics Publishing, 2001.

It is also possible to use more than two deposition techniques in the method. Secondary deposition techniques that are suitable for use in the invention along with plasma CVD include, e.g., vacuum sputtering, ion beam evaporation, thermal evaporation, e-beam evaporation, thermal CVD performed under either atmospheric pressure or vacuum, and photo induced CVD. The secondary deposition techniques are preferably used only for depositing the layer(s) of the ECD that are easy to deposit by other techniques, while plasma CVD is used to deposit the balance of the ECD layers. Thus, in certain embodiments, the first electron conducting layer, the ion conducting layer and the second electron conducting layer are provided by vacuum sputtering. In these embodiments, it is preferred that only the working electrode and the ion storage electrode are provided by plasma CVD.

In preferred embodiments, the entire method is conducted under relatively constant conditions. Thus, it is preferred that all of the providing steps comprise deposition under a vacuum. This avoids inefficiencies associated with processing in a plurality of different environments. The method is preferably free of wet chemical deposition techniques, such as sol-gel, so as to avoid inefficiencies associated with mixed wet and dry processing.

The method of the invention is capable of manufacturing a wide variety of ECDs. Novel ECDs produced by the inventive method are also within the scope of the invention. A preferred ECD of the invention comprises a first electron conducting layer on a substrate, a working electrode in communication with the first electron conducting layer, an ion conducting layer in communication with the working electrode, an ion storage electrode in communication with the ion conducting layer, and a second electron conducting layer in communication with the ion storage electrode, said method comprising providing by plasma chemical vapor deposition at least one and less than all of the first electron conducting layer, the working electrode, the ion conducting layer, the ion storage electrode, and the second electron conducting layer. The at least one layer deposited by plasma CVD has enhanced contact with at least one adjacent layer (e.g., the at least one layer adheres more durably to the layer on which it was deposited than it would have if it had been deposited by means other than plasma CVD). Preferably, the ECD further includes a bottom barrier layer between the substrate and the first electron conducting layer and/or a top barrier layer above the second electron conducting layer.

The first electron conducting layer is in electrical communication with a power source (e.g., a negative terminal of a battery). Preferred materials for this layer include, but are not limited to, tin doped indium oxide (ITO), zinc oxide doped with aluminum, antimony, gallium, tin, or boron and deposited by sputtering, tin oxide doped with antimony and deposited by sputtering, boron-doped zinc oxide deposited by low-temperature CVD under vacuum, fluorine doped tin oxide and zinc oxide deposited by thermal CVD. This layer is preferably about 200 nm to about 500 nm, more preferably 150 nm to 500 nm thick.

The working electrode comprises at least one electrochromic material. In preferred embodiments, the working electrode is normally colorless, but when reduced by the injection of an electron and charge compensating ion becomes colored by absorption, reflectance or a combination of both. Preferred electrochromic materials include, but are not limited to, $WO_3$, mixtures of $WO_3$ and $MoO_3$, mixtures of $WO_3$ and $VO_3$, and $Nb_2O_5$ and combinations thereof. The working electrode thickness is preferably about 200 nm to about 700 nm, more preferably 300 nm to 500 nm.

The ion conducting layer comprises an ionically conductive material adapted to reversibly inject ions into the working electrode, but whose overall degree of oxidation is essentially constant. Preferred materials for this layer include, but are not limited to, hydrated tantalum oxide and hydrated silicon dioxide for proton ion transfer and lithium based ceramics such as lithium silicate, lithium nitride, lithium aluminum fluoride, lithium aluminum silicate, and lithium niobate and mixtures thereof for lithium ion transfer. This layer is preferably about 50 nm to about 300 nm, more preferably 100 nm to 200 nm thick.

The ion storage electrode is adapted to reversibly inject ions into the ion conducting layer. Preferred materials for the ion storage electrode include, but are not limited to hydrated and anhydrous forms of vanadium oxide, nickel oxide, iridium oxide, niobium oxide, indium oxide and cobalt oxide and mixtures thereof. This electrode is preferably about 200 nm to about 700 nm, more preferably 300 nm to 500 nm thick.

The second electron conducting layer is in electrical communication with a power source (e.g., a positive terminal of a battery). Preferred materials for this layer include, but are not limited to indium tin oxide (ITO), zinc oxide doped with aluminum, antimony, gallium, tin, or boron and deposited by sputtering, and boron-doped zinc oxide deposited by low-temperature CVD under vacuum. This layer is preferably about 100 nm to about 500 nm, more preferably 200 nm to 500 nm thick.

The barrier layers can be made of the same or different materials. Preferred materials for these layers include, but are not limited to silicon oxide, aluminum oxide, zirconium oxide, and combinations thereof. The barrier layers are preferably about 10 nm to about 100 nm, more preferably 15 nm to 70 nm thick.

The substrate is preferably transparent. Suitable materials for the substrate include, but are not limited to glass, plastic and polymer web. It is important to carefully select the techniques used to deposit various ECD layers to avoid damage to plastic and polymer web based substrates. A glass substrate predeposited with a barrier layer and an electron conducting layer can also be used to deposit the remaining ECD layers according to the method of present invention. The barrier layer and electron conducting layer can be predeposited on glass by using a variety of processes, including a well known thermal CVD process commercially practiced by the glass industry. In this case, the barrier layer can be selected from silicon oxide, aluminum oxide, zirconium oxide and mixtures thereof. The electron conducting layer can be selected from fluorine doped tin oxide or fluorine doped zinc oxide.

Preferably, the ECD is completely solid state. As used herein, the expression "solid state" denotes that the ECD is free of gaseous, liquid and gel layers.

The invention encompasses in addition to an ECD method, an ECD apparatus comprising plasma CVD means and vacuum sputtering means.

A typical production line for depositing ECDs by vacuum sputtering contains a number of vacuum chambers that are placed in series. These chambers can be isolated from each other by placing gate valves between them. A load lock system is used to load substrate into the production line without breaking the vacuum in the system. The first few chambers of the production line are dedicated to plasma clean the substrate to remove foreign materials that may result in poor adhesion of the coating. The substrate is then moved on a conveyor belt through various vacuum chambers that are equipped to deposit a wide variety of coatings by sputtering. Eventually the ECD coated product exits the production line via a load lock system without disturbing the vacuum in the production system.

In the preferred embodiment of the method of the present invention, at least one of the vacuum chambers equipped to deposit coatings by sputtering in the production is replaced with vacuum chamber(s) equipped to deposit coatings by plasma enhanced CVD. This way one can use the existing production line, modify it to deposit at least one of the layers by plasma CVD, and produce ECDs cost effectively.

EXAMPLE

The invention will be illustrated in more detail with reference to the following Example, but it should be understood that the present invention is not deemed to be limited thereto.

The costs of manufacturing an ECD were modeled for depositing electrochromic tungsten oxide ($WO_3$) films by using two different deposition techniques: RF plasma enhanced chemical vapor deposition (PECVD) using tungsten hexafluoride and DC reactive magnetron sputtering of metal targets. In-line deposition systems for depositing film on 2 m×3 m glass plates and roll-to-roll systems for depositing film on 2 m-wide webs were considered. The costs of depreciation, raw materials, labor, power, and miscellaneous items were accounted for in the model. PECVD was predicted to give the best performance with a cost of $5.30/m$^2$ and an annual capacity of 1.4 million square meters of 2 m wide web at a deposition rate of 10 nm/sec. On glass with a similar deposition rate, the cost was $5.90/m$^2$ with an annual capacity of 1.3 million square meters. Sputtering was predicted to give the best performance with a cost of $15.00/m$^2$ and an annual capacity of 0.12 million square meters of 2 m-wide web at a deposition rate of 0.6 nm/sec. On glass with a similar deposition rate, the cost was $17.00/m$^2$ with an annual capacity of 0.1 million square meters. This example, therefore, showed significant cost and production benefits could be realized for depositing $WO_3$ working electrode either on glass or plastic substrate by plasma enhanced chemical vapor deposition compared to vacuum sputtering.

While the invention has been described in detail and with reference to specific examples thereof, it will be apparent to one skilled in the art that various changes and modifications can be made therein without departing from the spirit and scope thereof.

The invention claimed is:

1. A method of producing an electrochromic device, said method comprising the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein: i) the providing a working electrode step comprises a plasma enhanced chemical vapor deposition, ii) the method is free of wet chemical deposition techniques, and iii) the steps which do not comprise a plasma enhanced chemical vapor deposition, comprise vacuum sputtering.

2. The method of claim 1, wherein the working electrode and the ion storage electrode are provided by plasma enhanced chemical vapor deposition.

3. The method of claim 1, wherein the wherein the providing a working electrode and providing an ion conducting layer steps comprise a plasma enhanced chemical vapor deposition.

4. The method of claim 1, wherein the providing a working electrode, providing an ion conducting layer and providing an ion storage electrode steps comprise a plasma enhanced chemical vapor deposition.

5. The method of claim 1, wherein the electrochromic device is completely solid state.

6. The method of claim 1, wherein the working electrode comprises $WO_3$ deposited by plasma enhanced chemical vapor deposition.

7. The method of claim 1, further comprising providing a bottom barrier layer between the substrate and the first electron conducting layer and/or providing a top barrier layer above the second electron conducting layer.

8. The method of claim 1, wherein the working electrode is provided in communication with the first electron conducting layer before or after the second electron conducting layer is provided in communication with the ion storage electrode.

9. The method of claim 1, wherein the substrate is glass predeposited with a bottom barrier layer and the first electron conducting layer.

10. An apparatus adapted to perform the method of claim 1, said apparatus comprising:
at least one vacuum chamber adapted to plasma clean a surface of the substrate;
at least one vacuum chamber adapted to deposit at least one coating on the substrate by plasma enhanced CVD; and
at least one vacuum chamber adapted to deposit at least one coating by sputtering.

11. The method of claim 1 wherein the ion conducting layer comprises at least one member selected from the group consisting of tantalum oxide, silicon dioxide, lithium silicate, lithium nitride, lithium aluminum fluoride, lithium aluminum silicate and lithium niobate.

12. The method of claim 1 wherein the ion storage layer comprises at least one member selected from the group consisting of vanadium oxide, nickel oxide, iridium oxide, niobium oxide, indium oxide and cobalt oxide.

13. A method of producing an electrochromic device comprising a first electron conducting layer on a substrate, a working electrode in communication with the first electron conducting layer, an ion conducting layer in communication with the working electrode, an ion storage electrode in communication with the ion conducting layer, and a second electron conducting layer in communication with the ion storage electrode, said method comprising:

provide by plasma enhanced chemical vapor deposition the working electrode and at least one of the first electron conducting layer, the ion conducting layer, the ion storage electrode, and the second electron conducting layer; and providing by vacuum sputtering each of the first electron conducting layer, the ion conducting layer, the ion storage electrode, and the second electron conducting layer not provided by plasma enhanced chemical vapor deposition.

14. A method of producing an electrochromic device, said method comprising the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein the providing a working electrode and providing an ion conducting layer steps comprise a plasma enhanced chemical vapor deposition; and wherein the providing steps which do not comprise a plasma enhanced chemical vapor deposition, comprise vacuum sputtering.

15. A method of producing an electrochromic device, said method comprising the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein the providing a working electrode and providing an ion storage electrode steps comprise a plasma enhanced chemical vapor deposition; and wherein the providing steps which do not comprise a plasma enhanced chemical vapor deposition, comprise vacuum sputtering.

16. A method of producing an electrochromic device, said method comprising the steps of: providing a first electron conducting layer on a substrate, providing a working electrode in communication with the first electron conducting layer, providing an ion conducting layer in communication with the working electrode, providing an ion storage electrode in communication with the ion conducting layer, and providing a second electron conducting layer in communication with the ion storage electrode, wherein the providing a working electrode, providing an ion conducting layer and providing an ion storage electrode steps comprise a plasma enhanced chemical vapor deposition; and wherein the providing steps which do not comprise a plasma enhanced chemical vapor deposition, comprise vacuum sputtering.

* * * * *

UNITED STATES PATENT AND TRADEMARK OFFICE
CERTIFICATE OF CORRECTION

PATENT NO. : 7,307,772 B2 Page 1 of 1
APPLICATION NO. : 11/518802
DATED : December 11, 2007
INVENTOR(S) : Diwakar Garg and Philip B. Henderson It is certified that error appears in the above-identified patent and that said Letters Patent is hereby corrected as shown below:

Column 10, Line 19

In claim 3 delete the words "wherein the"

Signed and Sealed this

Eighth Day of April, 2008

JON W. DUDAS
*Director of the United States Patent and Trademark Office*